United States Patent
Kashani et al.

(10) Patent No.: US 10,768,915 B2
(45) Date of Patent: Sep. 8, 2020

(54) SYSTEMS AND METHODS FOR SELECTIVELY INSTRUMENTING A PROGRAM ACCORDING TO PERFORMANCE CHARACTERISTICS

(71) Applicant: Denso International America, Inc., Southfield, MI (US)

(72) Inventors: Ameer Kashani, Southfield, MI (US); Gopalakrishnan Iyer, Santa Clara, CA (US)

(73) Assignee: Denso International America, Inc., Southfield, MI (US)

( * ) Notice: Subject to any disclaimer, the term of this patent is extended or adjusted under 35 U.S.C. 154(b) by 17 days.

(21) Appl. No.: 16/164,173

(22) Filed: Oct. 18, 2018

(65) Prior Publication Data

US 2020/0125343 A1   Apr. 23, 2020

(51) Int. Cl.

| | |
|---|---|
| *G06F 9/44* | (2018.01) |
| *G06F 9/46* | (2006.01) |
| *G06F 11/36* | (2006.01) |
| *G06F 11/34* | (2006.01) |
| *G06F 11/30* | (2006.01) |

(Continued)

(52) U.S. Cl.
CPC ............ *G06F 8/4441* (2013.01); *G06F 21/57* (2013.01); *G06F 2221/033* (2013.01)

(58) Field of Classification Search
CPC ...... G06F 8/443; G06F 11/28; G06F 11/3006; G06F 11/3086; G06F 11/3466; G06F 11/3409; G06F 11/348; G06F 2201/88; G06F 2201/81; G06F 17/5022; G06F 11/3644; G06F 11/3612; G06F 2201/865; G06F 2201/033; G06F 21/57; G06F 11/3636; G06F 11/4441

See application file for complete search history.

(56) References Cited

U.S. PATENT DOCUMENTS

| | | | |
|---|---|---|---|
| 6,546,548 B1 * | 4/2003 | Berry .................. | G06F 11/3466 717/128 |
| 6,918,110 B2 | 7/2005 | Hundt et al. | |

(Continued)

OTHER PUBLICATIONS

Das et al., Section-Based Program Analysis to Reduce Overhead of Detecting Unsynchronized Thread Communication, 26 pages (Year: 2015).*

(Continued)

*Primary Examiner* — Thuy Dao
(74) *Attorney, Agent, or Firm* — Christopher G. Darrow; Darrow Mustafa PC (57) ABSTRACT

System, methods, and other embodiments described herein relate to determining performance overhead for instrumentation within a program. In one embodiment, a method includes, in response to compiling the program from source code into machine code, analyzing the program to generate overhead scores associated with segments of instrumentation within separate functions of the program. The instrumentation is combined with the source code to provide functionality in addition to a base functionality of the program. The method includes selectively modifying the segments in the source code for the separate functions according to whether the overhead scores for respective ones of the segments satisfies an instrumentation threshold associated with respective ones of the separate functions.

20 Claims, 4 Drawing Sheets

(51) Int. Cl.
*G06F 8/41* (2018.01)
*G06F 21/57* (2013.01)

(56) References Cited

U.S. PATENT DOCUMENTS

| | | | | |
|---|---|---|---|---|
| 7,587,709 | B2* | 9/2009 | Chilimbi | G06F 11/3636 717/128 |
| 8,307,375 | B2* | 11/2012 | Jones | G06F 11/3466 717/158 |
| 8,448,130 | B1 | 5/2013 | Pillarisetti et al. | |
| 8,726,251 | B2 | 5/2014 | Kalogeropulos et al. | |
| 8,826,254 | B2 | 9/2014 | Gounares et al. | |
| 9,703,681 | B2* | 7/2017 | Taylor | G06F 11/3664 |
| 2003/0163608 | A1* | 8/2003 | Tiwary | G06F 11/3414 710/1 |
| 2008/0148039 | A1* | 6/2008 | Cobb | G06F 11/3612 713/100 |
| 2011/0283263 | A1* | 11/2011 | Gagliardi | G06F 11/3612 717/130 |
| 2013/0275715 | A1 | 10/2013 | Caprioli et al. | |
| 2015/0309813 | A1 | 10/2015 | Patel | |
| 2016/0378987 | A1* | 12/2016 | Ferrara | G06F 21/566 726/1 |
| 2018/0285238 | A1 | 10/2018 | Somesula | |

OTHER PUBLICATIONS

Harel, A., Ben David, T., Kashani, A., Iyer, G. et al., "Mitigating Unknown Cybersecurity Threats in Performance Constrained Electronic Control Units," SAE Technical Paper 2018-01-0016, 2018, doi:10.4271/2018-01-0016.

Kumar et al.: "Low overhead program monitoring and profiling", Program Analysis for Software Tools and Engineering, pp. 28-34, 2005.

Mua Ler et al.: "Reducing the Overhead of Direct Application Instrumentation Using Prior Static Analysis", International Conference on Financial Cryptography and Data Security; [Lecture Notes in Computer Science; Lect.Notes Computer], pp. 65-76, 2011.

Hernandes et al.:"Compiler Support for Efficient Instrumentation", Parallel Computing: Architectures, Algorithms and Applications;[Proceedings of the International Conference Parco 2007]; [NIC Series; 38// Advances in Parallel Computing; 15], pp. 661-668, 2007.

\* cited by examiner

SYSTEMS AND METHODS FOR SELECTIVELY INSTRUMENTING A PROGRAM ACCORDING TO PERFORMANCE CHARACTERISTICS

TECHNICAL FIELD

The subject matter described herein relates in general to systems and methods for determining performance overhead attributed to instrumentation within a program and, more particularly, to dynamically determining the performance overhead and automatically modifying which instrumentation is included within the program according thereto.

BACKGROUND

Instrumentation, in the context of computer programs, generally refers to additional code that is added to functions within a program in order to provide for additional functionality. The additional functionality can relate to additional functional hooks, ensuring security, providing for traceability, and so on. In any case, the added instrumentation intrinsically influences performance of the program. Thus, when such instrumentation is added indiscriminately to each function an overall performance of the program can suffer from increased overhead.

Moreover, while various methods determine the overall overhead for executing the program as a whole, assessing overhead in relation to particular segments of instrumentation can represent significant difficulties. This can be because the source code of the instrumentation is integrated alongside source code of the program itself thereby complicating the process of attributing the overhead to the source code of the program or to the source code of the instrumentation. Consequently, determining how to best instrument a program generally involves a manual trial and error process of adding and removing instrumentation, which is inefficient.

SUMMARY

In one embodiment, example systems and methods associated with determining performance overhead for instrumentation within a program are disclosed. As previously noted, separately identifying performance overhead that is particular to instrumentation within distinct functions is generally not feasible with current solutions. Thus, present approaches may resort to manually removing random instrumentation in order to adjust performance overhead through a trial and error approach. As may be expected, such an approach is generally inefficient and may not result in an optimal solution.

Therefore, in one embodiment, an overhead assessment system that determines performance overhead individually for separate segments of instrumentation is disclosed. For example, in one approach, the disclosed system initially identifies an instruction count of the program instructions and the instrumentation instructions. The overhead assessment system identifies the instruction counts on a per-function basis in order to produce a basis from which overhead can be attributed to separate aspects of the functions (e.g., instrumentation versus base source code).

The overhead assessment system, in one approach, also determines a runtime coverage for the respective functions. The overhead assessment system can determine the runtime coverage using, for example, a dynamic assessment of the program while the program is executing or through a static analysis of the program. The overhead assessment system implements the dynamic assessment through analyzing the program to dynamically capture behaviors of the program when executing, for example, in a development test environment. The dynamic assessment provides indications of which functions execute and an amount of time (e.g., percent of overall execution time) attributable to the separate functions. Alternatively, the overhead assessment system performs the static analysis by, for example, assessing the program through an application entry point and using a recursive search to identify an execution path and predicted execution times associated with the separate functions therefrom. In either case, the overhead assessment system generates the runtime coverage to further assess the performance overhead of the program.

Subsequently, the overhead assessment system uses the instruction counts and the runtime coverage to attribute performance overhead (e.g., execution time) to the separate functions and, by extension, to the instrumentation within the separate functions. Accordingly, the overhead assessment system represents this overhead through generating overhead scores associated with the instrumentation within the respective functions. As such, the overhead assessment system, in one embodiment, then reports the various overhead scores for the instrumentation by visually displaying the overhead scores on an electronic display or generating the report in another suitable form.

In further aspects, the overhead assessment system selectively modifies (e.g., removes) instrumentation within the functions according to an instrumentation policy. In one embodiment, the instrumentation policy defines thresholds that facilitate determining when to remove or maintain instrumentation within a function. For example, the instrumentation thresholds can vary according to characteristics of a particular function such as importance, security, and so on.

Consequently, when the overhead assessment system is selectively modifying the separate functions to include instrumentation, the system references overhead scores for the instrumentation of the separate functions in comparison to the instrumentation threshold to determine whether or not the instrumentation is to be removed. Accordingly, the overhead assessment system is able to automatically and dynamically adjust instrumentation within a program in order to improve overall performance overhead while ensuring particular functions remain instrumented. In this way, the overhead assessment system improves the functioning of the program by selectively including instrumentation in particular functions of the program while removing instrumentation from other functions.

In one embodiment, an overhead assessment system for selectively instrumenting a program is disclosed. The overhead assessment system includes one or more processors and a memory that is communicably coupled to the one or more processors. The memory stores a performance module including instructions that when executed by the one or more processors cause the one or more processors to analyze the program to generate overhead scores associated with segments of instrumentation within separate functions of the program. The instrumentation is combined with source code of the program to provide functionality in addition to a base functionality of the program. The memory stores an instrumentation module including instructions that when executed by the one or more processors cause the one or more processors to selectively modify the segments in the source code of the program for the separate functions according to whether the overhead scores for respective ones of the segments satisfies an instrumentation threshold associated with respective ones of the separate functions.

In one embodiment, a non-transitory computer-readable medium is disclosed. The computer-readable medium stores instructions that when executed by one or more processors cause the one or more processors to perform the disclosed functions. The instructions include instructions to analyze the program to generate overhead scores associated with segments of instrumentation within separate functions of the program. The instrumentation is combined with the source code to provide functionality in addition to a base functionality of the program. The instructions include instructions to selectively modify the segments in the source code of the program for the separate functions according to whether the overhead scores for respective ones of the segments satisfies an instrumentation threshold associated with respective ones of the separate functions.

In one embodiment, a method of selectively instrumenting a program is disclosed. The method includes, in response to compiling the program from source code into machine code, analyzing the program to generate overhead scores associated with segments of instrumentation within separate functions of the program. The instrumentation is combined with the source code to provide functionality in addition to a base functionality of the program. The method includes selectively modifying the segments in the source code for the separate functions according to whether the overhead scores for respective ones of the segments satisfies an instrumentation threshold associated with respective ones of the separate functions

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with determining performance overhead for instrumentation within a program are disclosed. As previously noted, current solutions for assessing overhead associated with instrumentation within a program are generally ineffective. That is, present approaches generally resort to manually determining overhead through a trial and error approach. This is generally ineffective at producing an optimal solution and thus may lead to difficulties with effectively instrumenting a program that results in, for example, reduced performance.

Therefore, in various embodiments, an overhead assessment system and associated methods are disclosed that determine performance overhead individually for functions and corresponding instrumentation. In one approach, a disclosed system uses instruction counts that are identified when a program is compiled to generate a basis for assessing performance. The overhead assessment system identifies the instruction counts on a per-function basis in order to attribute performance overhead to separate aspects of the functions (e.g., instrumentation versus base source code).

The overhead assessment system, in one embodiment, also determines a runtime coverage for the respective functions. The runtime coverage generally indicates a percentage of the execution time that is attributed to the separate functions. The overhead assessment system can determine the runtime coverage using, for example, a dynamic assessment of the program while the program is executing or, alternatively, through a static analysis of the program. Determining the runtime coverage via the dynamic assessment includes, in one embodiment, analyzing the program while the program is executing in a development/test environment to dynamically capture behaviors of the program. The assessed behaviors provide insights into which functions execute more frequently and thus an amount of time (e.g., percent of overall execution time) attributable to the separate functions. In alternative arrangements, the overhead assessment system performs a static analysis that algorithmically analyzes the program to predict execution paths and provide predicted execution times therefrom. In either case, the overhead assessment system generates the runtime coverage to further assess the performance overhead of the program.

Subsequently, the overhead assessment system applies the instruction counts to the runtime coverages of the separate functions to attribute execution time to the separate functions and, by extension, to the instrumentation within the separate functions. Consider the following mathematical approach. Assuming that K is an execution time factor, p is an execution time for an instrumented function, and q is the execution time for the un-instrumented function, then:

$$K=p/q \qquad (1)$$

Since (p−q) can be approximated to be a constant, it is defined as a constant C. Thus, the above equation can be rewritten as:

$$K=(q+c)/q \qquad (2)$$

$$K=1+C/q \qquad (3)$$

Accordingly, from the above-noted equations it can be observed that as q grows, K will grow closer to 1. As such, as the original function size grows, then the impact of instrumentation will become smaller. In general, the noted values will vary when instrumenting different functions since the execution time of different functions varies along with the instruction counts.

Accordingly, the overhead assessment system represents this overhead through generating overhead scores associated with the instrumentation within the respective functions. The overhead scores generally relate the execution time for a given function in a piecewise manner to the source code of the program itself and to the instrumentation with the function according to, for example, a ratio of the instrumented code to the overall code of the function.

As such, the overhead assessment system, in one embodiment, modifies (e.g., removes) instrumentation from functions according to an instrumentation policy. In one embodiment, the instrumentation policy defines thresholds that facilitate determining when to remove or maintain instrumentation within a function. For example, the instrumentation thresholds can vary according to characteristics of a particular function such as importance, security, and so on. Thus, in a circumstance where a particular function is considered critical to the security of the program, then the instrumentation threshold may be relatively high. By contrast, where a function is for a secondary feature that does not expose any security risks, the instrumentation threshold may be relatively low meaning that the function is more likely to be stripped of the instrumentation relative to a security critical function.

Consequently, when the overhead assessment system is selectively modifying the separate functions to include instrumentation, the system compares overhead scores for the instrumentation to the respective instrumentation threshold to determine whether or not the instrumentation should be removed. Accordingly, the overhead assessment system is able to assess an impact of the instrumentation and dynamically adjust the instrumentation within a program to improve overall performance overhead (i.e., overall runtime) of the program.

Figure 1:
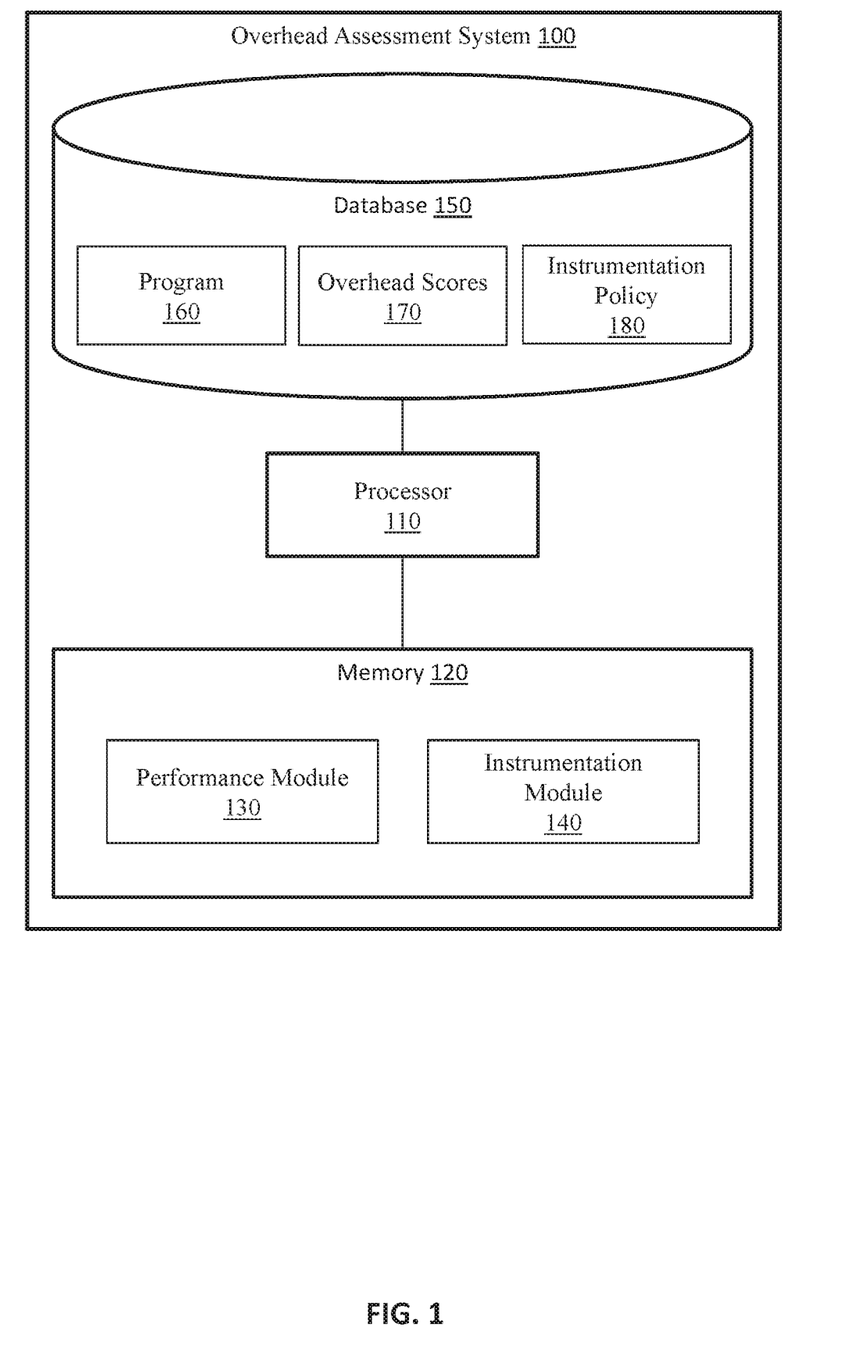
FIG. 1 illustrates one embodiment of an overhead assessment system that is associated with analyzing a program to generate overhead scores from which instrumentation is selectively modified to improve performance of the program.

Referring to FIG. 1, one embodiment of an overhead assessment system 100 is illustrated. While arrangements will be described herein with respect to the overhead assessment system 100, it will be understood that embodiments are not limited to a unitary system as illustrated. In some implementations, the overhead assessment system 100 may be embodied as a cloud-computing system, a cluster-computing system, a distributed computing system, a software-as-a-service (SaaS) system, and so on. Accordingly, the overhead assessment system 100 is illustrated and discussed as a single device for purposes of discussion but should not be interpreted to limit the overall possible configurations in which the disclosed components may be configured. For example, the separate modules, memories, databases, and so on may be distributed among various computing systems in varying combinations.

The overhead assessment system 100 also includes various elements. It will be understood that in various embodiments it may not be necessary for the overhead assessment system 100 to have all of the elements shown in FIG. 1. The overhead assessment system 100 can have any combination of the various elements shown in FIG. 1. Further, the overhead assessment system 100 can have additional elements to those shown in FIG. 1. In some arrangements, the overhead assessment system 100 may be implemented without one or more of the elements shown in FIG. 1. Further, while the various elements are shown as being located within the overhead assessment system 100 in FIG. 1, it will be understood that one or more of these elements can be located external to the overhead assessment system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the overhead assessment system 100 is implemented to perform methods and other functions as disclosed herein relating to providing information about the performance overhead of instrumentation within a program. The noted functions and methods will become more apparent with a further discussion of the figures. Furthermore, the overhead assessment system 100 is shown as including a processor 110. Thus, in various implementations, the processor 110 may be a part of the overhead assessment system 100, the overhead assessment system 100 may access the processor 110 through a data bus or another communication pathway, the processor 110 may be a remote computing resource accessible by the overhead assessment system 100, and so on. In either case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the overhead assessment system 100 includes a memory 120 that stores a performance module 130, and an instrumentation module 140. The memory 120 is a random-access memory (RAM), read-only memory (ROM), a hard-disk drive, a flash memory, or other suitable memory for storing the modules 130, and 140. The modules 130, and 140 are, for example, computer-readable instructions that when executed by the processor 110 cause the processor 110 to perform the various functions disclosed herein. In various embodiments, the modules 130, and 140 can be implemented in different forms that can include but are not limited to hardware logic, an ASIC, components of the processor 110, instructions embedded within an electronic memory, and so on.

With continued reference to the overhead assessment system 100, in one embodiment, the system 100 includes a database 150. The database 150 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 150 stores data used by the modules 130 and 140 in executing various determinations. In one embodiment, the database 150 stores the program 160. In further embodiments, the overhead assessment system 100 stores the program 160 in the memory 120, a specialized data structure, a cache memory of the processor 110, or another suitable data storage component.

As used herein, the program 160 refers to compiled machine code that is derived from source code. Thus, the program 160 is, in one embodiment, a compiled program or portion thereof that is machine code. The phrase "machine code" as used herein generally refers to a program that is represented in machine language instructions that can be, for example, executed by a microprocessor such as the processor 110. Moreover, the machine code is generally understood to be a primitive or hardware-dependent language that is comprised of opcodes defined by an instruction set implemented by associated hardware. Furthermore, the machine code itself is further comprised of data values, register addresses, memory addresses, and so on. Of course, while the program 160 is discussed as being machine code, in further embodiments, the program 160 is assembly code or another intermediate representation of the source code.

The source code from which the program 160 is compiled is comprised of, for example, functions, data structures, objects, statements, and so on. In general, the program 160 is organized as a set of functions. In various renditions, the functions may be nested within one another as sub-functions. Moreover, the functions are generally comprised of a set of statements (e.g., loops, I/O statements, etc.) and are typically focused on a particular functionality. That is, each separate function is generally implemented to perform a particular task. Thus, sub-functions may implement subroutines in support of a broader functionality of a parent function. In either case, the functions include source code that defines the statements that form the function itself and provide for implementing the functionality associated with the function. Moreover, the functions are also developed to include statements that implement the instrumentation.

As noted, the instrumentation can serve different purposes depending on a particular implementation. For example, the instrumentation can be integrated within a function to provide for controlling program flow (e.g., ensuring the program isn't misdirected), for debugging, for verifying data arguments, for verifying I/O, and so on. For example, in an instance where the program 160 controls an advanced driving assistance system (ADAS) to automatically adjust how a vehicle is controlled on the road, the instrumentation may include security instrumentation to prevent malicious manipulation of the program 160 that could result in an accident and injury to passengers if the program 160 is misdirected through a malicious attack.

Regardless of the purpose of the instrumentation, adding additional statements to the source code results in additional instructions within the compiled program 160. These additional instructions inherently affect the performance overhead of the program 160 by adding further execution time. Additional aspects of the program 160 and the performance overhead will be discussed subsequently.

Continuing with the database 150, in one embodiment, the database 150 also stores one or more overhead scores 170 and an instrumentation policy 180. As will be discussed in greater detail subsequently, the performance module 130 produces the overhead scores 170 according to instruction counts for the instrumentation and the program source code relative to the runtime coverage for separate functions. Thus, in one embodiment, the overhead scores 170 include distinct scores associated with each function in the program 160.

The instrumentation policy 180, in one embodiment, defines instrumentation thresholds or at least metrics for generating the instrumentation thresholds. In one approach, the instrumentation policy 180 defines instrumentation thresholds for different classes of functions. For example, the instrumentation policy 180, in one embodiment, defines classes for functions according to the security level. Thus, the instrumentation policy 180 can indicate a first threshold for a first class, a second threshold for a second class, a third threshold for a third class and so on. In general, the separate classes and associated thresholds for security levels may relate to a vulnerability of a particular function (e.g., exposure to manipulation). Thus, the instrumentation policy 180 may indicate a higher threshold (e.g., greater impact on performance overhead) that is permissible for a relatively sensitive/important function, whereas a less important/sensitive function may have a lower threshold or permissible impact on performance. Thus, in practice, the less important function is generally more likely to have instrumentation removed by the instrumentation module 140.

As a further example, the instrumentation policy 180, in one approach, defines separate thresholds accordingly to functional relevance of the functions. That is, if a particular function is considered to be relatively more important or central to the functioning of the program 160, then the given function has characteristics that elevate a functional level and thus an associated instrumentation threshold relative to the functional level. Moreover, in further aspects, the instrumentation policy 180 indicates multiple classifications for functions. That is, a function can have multiple characteristics including, for example, both security and functional relevance. Thus, the performance module 130, in one approach, considers multiple classifications to generate an instrumentation threshold according to the characteristics of the function (e.g., importance level). Thus, in various approaches, the performance module 130 may separately calculate the respective instrumentation thresholds for different functions of the program 160. Of course, while functional levels and security levels are generally discussed in relation to the instrumentation policy 180, these classifications are provided as examples for purposes of discussion. It should be understood that the breadth of the present disclosure may also encompass other classifications, as previously noted.

Accordingly, continuing with FIG. 1, the performance module 130, in one embodiment, includes computer-readable instructions that when executed by the processor 110, cause the processor to generate the overhead scores 170 associated with respective segments of instrumentation within separate functions of the program 160. That is, as previously noted, the performance module 130 generates the scores 170 for the functions in the program. Accordingly, the performance module 130 generally produces a plurality of scores when analyzing the program 160.

Moreover, a particular timing associated with the performance module 130 generating the scores 170 can vary depending on a particular implementation. In one approach, the performance module 130 generates the overhead scores 170 responsive to the program 160 being compiled from source code into machine code. Thus, in one embodiment, the performance module 130 executes while a compiler is generating the machine code from the source code to actively track the functions and determine instruction counts produced by the compiler for the instrumentation and the base functionality of each respective function. As used herein, the base functionality generally refers to source code and associated functions performed by the source code that is independent of the instrumentation and related to a purpose of the program. By contrast, the instrumentation is provided as a, for example, security mechanism that improves security of the program but is not necessarily directly related to the purpose of the program itself.

In alternative arrangements, the performance module 130 uses instruction counts of the source code as a manner of approximating the instruction counts in machine code. For example, the performance module 130, in one approach, simply uses the instruction counts from the source code without translating or otherwise determining corresponding precise machine code instruction counts. In further aspects, the performance module 130 determines the instruction count according to a predefined correlation between source code statements and standardized machine code equivalents. The performance module 130, in one embodiment, stores a correlation ledger that indicates how many machine code instructions typically correspond with each particular source code instruction. From this ledger, the performance module 130, in one embodiment, calculates the instruction counts.

It should be appreciated that as used herein, instruction count generally refers to either source code instructions or machine code instructions and the particular type of instruction that is counted by the performance module 130 can vary according to a particular implementation. Of course, as may be appreciated, using machine code instruction counts provides, for example, a greater accuracy when determining attributable execution time while using source code instruction counts is generally a less precise but simpler approach.

Moreover, it should be appreciated that the term "source code" as used herein generally refers to a high-level programming language from which the machine code is derived. That is, a component such as a compiler or an interpreter generally produces the machine code as an executable form of the source code. The source code is, for example, originally generated by a developer using functions, statements, data arguments, data structures, and other programmatic constructs that are abstracted forms of the machine code. According to policies and procedures implemented by the compiler, the compiler translates the source code into the machine code.

Furthermore, the performance module 130 generally determines an instrumentation instruction count and a program instruction count. The instrumentation instruction count relates to the instrumentation included within a function while the program instruction count relates to the remaining instructions within the function that are not attributed to the instrumentation and relate instead to the base functionality associated with the function itself. Thus, the performance module 130 generates the program instruction count and the instrumentation function count for the separate functions within the program 160.

The performance module 130 also generates the runtime coverage. In one embodiment, the runtime coverage refers to a percent of the overall execution time of a program that is attributable to the functions of the program 160. Thus, by way of example, consider that the program 160 executes for 100 seconds. Further consider that the program 160 is comprised of four functions A, B, C, and D. In one approach, the performance module 130 tracks execution of the program 160 in a test/development environment. The test/development environment is, for example, a controlled operating environment within which various aspects of the execution of the program 160 can be tracked. Thus, the performance module 130 dynamically tracks which functions are executing at a given point in time during the analysis.

As such, the performance module 130 attributes portions of the overall execution time to the functions. Continuing with the above example, consider that the performance module 130 tracks Function A as executing for 50 seconds, Function B as execution for 32 seconds, Function C as execution for 15 seconds and Function D as executing for 3 seconds. Thus, the performance module assessing the functions with the following percentages of execution time A-50%, B-32%, C-15%, and D-3%.

Therefore, using the determined runtime coverage of the separate functions, the performance module 130 determines the overhead scores 170. In alternative embodiments, the performance module 130 uses a static analysis of the program 160 instead of the aforementioned dynamic analysis. That is, the performance module 130 algorithmically parses and steps through the program 160 to determine likely execution paths and likely execution times for respective functions therefrom. In one approach to the static analysis, the performance module 130 implements a limited path depth recursive analysis of the program 160 from a selected program entry point to generate the runtime coverage statically. Thus, the performance module 130 steps through instructions of the program 160 while attributing defined execution times to the instructions according to averages or expected instruction execution times. The performance module 130 follows the instructions of each function according to the recursive limited path depth approach and assesses execution times of the functions therefrom. Thus, as a result, the performance module 130 provides runtime coverages attributable to the separate functions of the program 160 in a form similar to those provided by the dynamic approach.

From the noted instruction counts and the runtime coverage assessment, the performance module 130 calculates the overhead scores 170 of the functions. In particular, the performance module 130, in one approach, determines a ratio of the instrumentation instructions included in a function to the overall instructions of the function. That is, the performance module 130 uses the instrumentation count and the program count for the function to identify an amount of the overall instructions for the function that are attributable to the instrumentation as, for example, a percent or ratio. Thus, in one approach, the performance module 130 determines the ratio according to the following: Instrumentation attributable portion=(instrumentation count)/(instrumentation count+program count).

The performance module 130 uses the determined runtime coverage of the separate functions in conjunction with the instruction count attributable to the instrumentation to produce the overhead scores 170. In one approach, the performance module 130 calculates the overhead scores 170 by multiplying the runtime coverage and the instrumentation attributable portion for a given function together. The performance module 130 uses the resulting value as the overhead scores or, alternatively, in further approaches, normalizes or otherwise translates the resulting values into a further form to generate the overhead scores 170.

Continuing with the above example of functions A, B, C, and D, consider that the instrumentation values produced according to the instruction counts for the noted functions are as follows A-6%, B-10%, C-1%, and D-19%. Thus, the noted functions include varying extends of instrumentation relative to program source code. As such, assume for purposes of explanation, that the performance module 130 implements the overhead scores 170 using raw multiplication of the runtime coverage values and the instruction count values. Thus, the resulting overhead scores for the present example are as follows: A-0.003, B-0.0032, C-0.0015, and D-0.0057. Accordingly, overhead scores 170 illustrate how an amount of instrumentation of a function within the program 160 can influence overall execution time.

Once the performance module 130 generates the overhead scores 170, the instrumentation module 140 executes to perform various actions according to the overhead scores. In one embodiment, the instrumentation module 140 electronically displays the overhead scores 170 within a development environment in order to inform a developer about the impact of the instrumentation on performance overhead. In various approaches, the overhead assessment system 100 generates and displays the overhead scores 170 dynamically as a developer generates the program 160. Thus, overhead assessment system 100 generates the scores 170, in one embodiment, to provide a mechanism by which to influence choices of a developer about what instrumentation is included within the program 160.

Additionally, or alternatively, in one approach, the instrumentation module 140 selectively modifies the program 160 to automatically remove instrumentation. That is, the instrumentation module 140 uses the overhead scores 170 and overhead thresholds to determine whether to remove instrumentation from a function. As noted previously, the instrumentation module 140 uses instrumentation thresholds defined by the instrumentation policy 180 or at least generates the thresholds from information defined within the instrumentation policy 180. The thresholds are defined according to characteristics of the functions in order to tailor the thresholds to the functions and provide an intelligent approach to determining which function should retain instrumentation while others should be stripped of instrumentation.

Moreover, in one aspect, the instrumentation module 140 dynamically adjusts the thresholds according to whether the program satisfies an overall performance standard. That is, the instrumentation policy 180, in one approach, defines an expected execution time or other performance metric for the program 160. Thus, the performance module 130 measures the overall performance of the program 160 including the instrumentation, and if the overall performance is, for example, below a defined value, then the instrumentation module 140 further factors the overall performance into the instrumentation thresholds for the particular functions. In this way, the overhead assessment system 100 can dynamically assess the performance of the program 160 and ensure the instrumentation is adjusted to improve operation of the program 160.

In either case, the instrumentation module 140 compares the overhead scores for the respective functions of the program 160 with the overhead scores 170. For functions that satisfy the instrumentation threshold (e.g., exceed the defined values), the instrumentation module 140 removes the instrumentation from the function. The instrumentation module 140, in various approaches, removes the instrumentation using various approaches. In one approach, the instrumentation module 140 changes the instrumentation within source code of the program 160 into comments in order to remove the instrumentation from a functional perspective (i.e., the instrumentation is no longer compiled into usable machine code) but still leave the commented instrumentation code as a marker of the removal. In further aspects, the instrumentation module 140 simply removes the instrumentation from noted functions and may log or record the removal. In either case, the system 100 removes the instrumentation according to the overhead scores 170 and the instrumentation thresholds in order to improve operation of the related function and thus the program 160.

Figure 2:
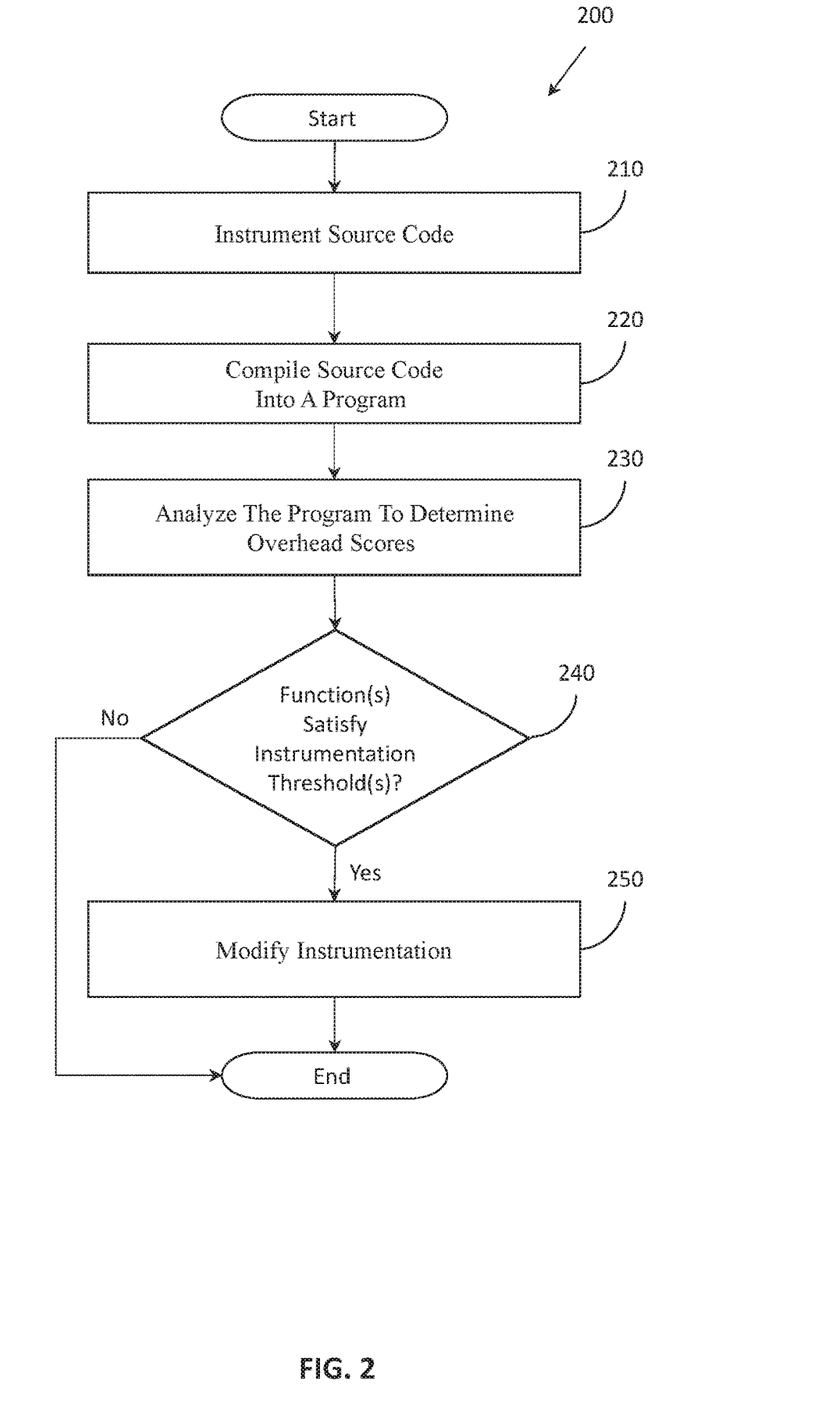
FIG. 2 illustrates one embodiment of a method associated with generating overhead scores for various aspects of a program from which instrumentation is selectively modified to improve performance of the program.
Figure 3:
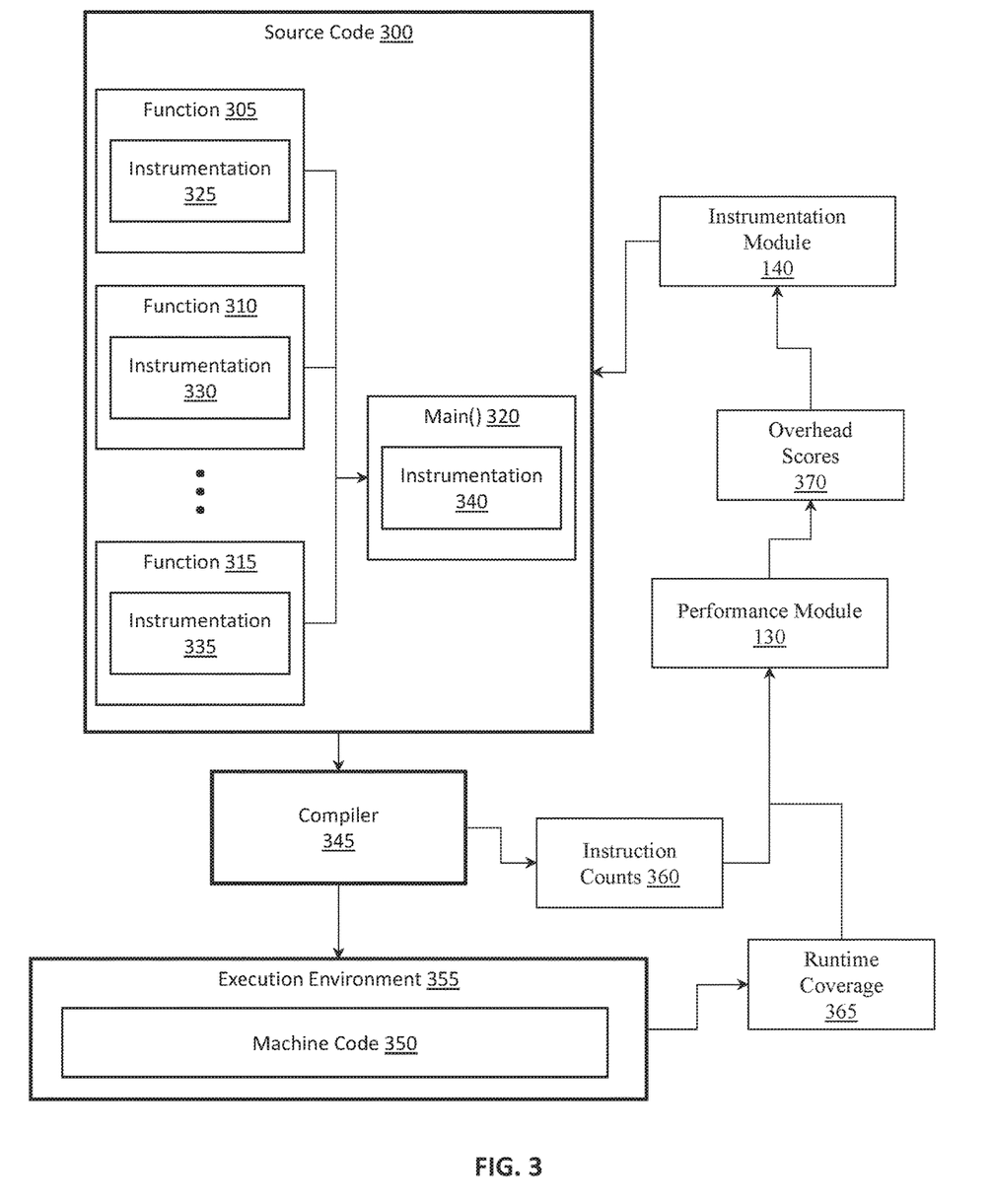
FIG. 3 illustrates one example of a process flow associated with analyzing and selectively modifying a program.

Additional aspects of assessing performance overhead of a program in relation to instrumentation will be discussed in relation to FIG. 2. FIG. 2 illustrates a method 200 associated with generating overhead scores for a program and selectively instrumenting the program according thereto. Method 200 will be discussed from the perspective of the overhead assessment system 100 of FIG. 1. While method 200 is discussed in combination with the overhead assessment system 100, it should be appreciated that the method 200 is not limited to being implemented within the overhead assessment system 100 but is instead one example of a system that may implement the method 200. Furthermore, the method 200 is also discussed in combination with an example process flow as illustrated in FIG. 3. FIG. 3 generally illustrates the process flow associated with various data elements (e.g., source code 300) and the components of the system 100. Thus, FIG. 3 is discussed along with the method 200 to facilitate the discussion through a visual example. Thus, it should be appreciated that the arrangements illustrated in FIG. 3 represent a single embodiment and should not be construed to limit the method 200 to the process flow of FIG. 3.

At 210, source code 300 is instrumented. The process of instrumenting the source code 300 may be either automated or manual. That is, in one approach, the overhead assessment system 100 automatically adds segments of instrumentation into the source code 300 according to annotations in the source code 300, a programmatic analysis of the source code 300, or another approach. In any case, the source code 300 is generally comprised of a set of functions (e.g., functions 305, 310, 315, and 320). The functions include various sets of source code that generally provide different abilities to a program that is derived from the source code 300. As represented in FIG. 3, the source code 300 includes a main function 320 along with various sub-functions 305, 310, and 315. Accordingly, whether the functions are atomic or comprised of sub-functions, in various embodiments, the functions can include instrumentation. Thus, the functions 305, 310, 315, and 320 include respective instrumentation 325, 330, 335, and 340.

Figure 4:
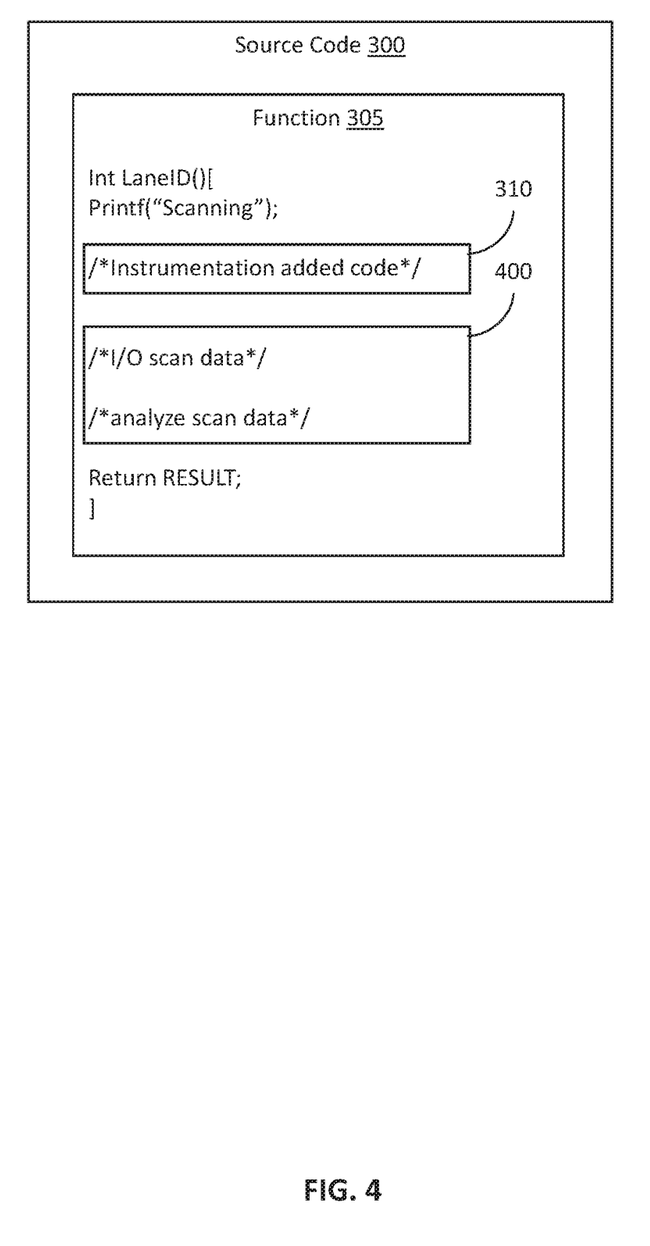
FIG. 4 illustrates one example of an instrumented function.

As one example of a function, consider FIG. 4, which illustrates further detail about the function 305 from FIG. 3. As shown, the function 305 is a LaneID function that, for example, analyzes scan data generated sensors of a vehicle about a surrounding roadway to identify lanes. The function 305 includes instrumentation 310 as a segment of source code along with segment 400 of base source code that performs the noted functions. It should be appreciated that the actual source code of the function 305 is generally not illustrated and is instead replaced with comment blocks; however, the separate sections of code 310 and 400 illustrate how the instrumentation 310 is integrated with the function 305 and among the other source code (e.g., source code 400). Additionally, while the instrumentation 310 is illustrated as being serial and distinct from the source code 400, the instrumentation 310, in one or more embodiments, can be intermingled between statements of the source code segment 400.

At 220, the source code 300 is compiled into machine code 350. In one embodiment, the overhead assessment system 100 includes a compiler 345 that compiles the source code 300 into the machine code 350. In further approaches, the compiler 345 is distinct and separate from the system 100 but may communicate with the system 100 to provide the machine code 350 and/or information about the machine code 350. In one approach, the process of compiling the source code 300 initiates the system 100 to analyze the performance of the compiled program. Of course, in further approaches, the system 100 initiates the compiling as part of generating the overhead scores 170 or through a separate manual mechanism. In either case, for purposes of discussion, consider that the source code 300 is compiled into the machine code 350 (e.g., program 160) and that the compiling initiates the determination of overhead scores.

At 230, the performance module 130 analyzes the program to generate overhead scores 370 associated with respective segments of instrumentation within separate functions of the program. The performance module 130, in one embodiment, communicates with the compiler 345 to ascertain the instruction counts 360 of the machine code 350. As previously noted, in alternative approaches, the performance module 130 generates the instruction counts 360 directly from the source code 300 using either approximations of the machine code 350 or by simply using instruction counts of the source code 300 itself. In either case, the instruction counts 360 provide a metric by which to attribute execution times to the various functions.

Furthermore, at 230, the performance module 130 also dynamically captures the runtime coverage for the separate functions of the program. As shown in FIG. 3, the performance module 130 acquires the runtime coverage from an execution environment 355. The execution environment 355 is, for example, a development or test environment that provides function hooks or other mechanisms for the performance module 130 to access and track execution of the machine code 350 (i.e., program 160). Accordingly, the performance module 130 can identify when and for how long separate functions are executing. Thus, the performance module 130 generates or at least acquires the runtime coverage 365 through tracking the execution of the program in the test environment.

Thereafter, the performance module 130 uses the runtime coverage 365 and the instruction counts 360 to generate the overhead scores 370. The performance module 130 calculates the overhead scores for the respective segments associated with the separate functions as a ratio of a program count and an instrumentation count relative to a runtime coverage for the respective segments. That is, each overhead score is specific to a function. Accordingly, the performance module 130 generates the overhead scores 370 with a level of granularity that is particular to the functions of the program. Of course, in further aspects, the particular layer of abstraction at which the performance module 130 generates the overhead scores 370 may vary according to a particular implementation but generally follows defined logical segments within the source code 300.

At 240, the instrumentation module 140 compares the overhead scores 170/370 to the instrumentation threshold(s) to determine if the overhead scores 170/370 satisfy the instrumentation thresholds. As previously explained, the instrumentation thresholds are specific to the independent functions and the instrumentation module 140 determines the instrumentation thresholds for the functions according to characteristics of the functions. The instrumentation module 140 references the instrumentation policy 180 to correlate the characteristics with values used to define the thresholds. In this way, the instrumentation module 140 accounts for differences in characteristics between functions when determinizing how to selectively instrument the functions.

Moreover, as used herein, satisfying the instrumentation threshold generally includes exceeding the threshold. For example, if the threshold is 0.003 and the overhead score is 0.0032, then the score exceeds the threshold. Of course, the instrumentation module 140 may also define the satisfaction of the threshold differently in further approaches including greater than or equal to, greater than or within at least a margin less than, less than the threshold, and so on. In general, the particular relationship is defined such that instrumentation that adds excessive overhead beyond what is identified via the threshold is subsequently removed.

At 250, the instrumentation module 140 selectively modifies segments of the instrumentation. In one embodiment, the instrumentation module 140 removes instrumentation from functions where the threshold is satisfied. Thus, the instrumentation module 140 removes the instrumentation when, for example, the value of the instrumentation is outweighed by the performance overhead increase realized from inclusion of the instrumentation. As such, the instrumentation module 140 removes the instrumentation from select functions to improve execution of the program 160 for unsatisfactory functions that do not satisfy the instrumentation threshold.

In further aspects, the instrumentation module 140 replaces the existing instrumentation at 250 instead of wholly removing the instrumentation. For example, the instrumentation module 140 optimizes the instrumentation by selecting alternative instrumentation that is better suited for the particular associated function, removing a portion of the instrumentation, re-arranging a manner in which the instrumentation is executed (e.g., conditions that invoke the instrumentation) or, more generally, by altering the instrumentation that is included with the function such that the impact on the overhead score is to reduce an effect of the instrumentation on execution times. In this way, the instrumentation module 140 can either wholly remove the instrumentation or alter the instrumentation to achieve an improved performance of the program overall.

Additionally, it should be appreciated that the overhead assessment system 100 from FIG. 1 can be configured in various arrangements with separate integrated circuits and/or chips. In such embodiments, the performance module 130 from FIG. 1 is embodied as a separate integrated circuit. Additionally, the instrumentation module 140 is embodied on an individual integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130 and 140 may be combined into a separate application-specific integrated circuit. In further embodiments, portions of the functionality associated with the modules 130 and 140 may be embodied as firmware executable by a processor and stored in a non-transitory memory. In still further embodiments, the modules 130 and 140 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 200 of FIG. 2) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The overhead assessment system 100 can include one or more processors 110. In one or more arrangements, the processor(s) 110 can be a main processor of the overhead assessment system 100. For instance, the processor(s) 110 can be an electronic control unit (ECU). The overhead assessment system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An overhead assessment system for selectively instrumenting a program, comprising:
    one or more processors;
    a memory communicably coupled to the one or more processors and storing:
    a performance module including instructions that when executed by the one or more processors cause the one or more processors to analyze the program to generate overhead scores associated with segments of instrumentation within separate functions of the program, wherein the instrumentation is combined with source code of the program to provide functionality in addition to a base functionality of the program; and
    an instrumentation module including instructions that when executed by the one or more processors cause the one or more processors to selectively modify the segments in the source code of the program for the separate functions according to whether the overhead scores for respective ones of the segments satisfies an instrumentation threshold associated with respective ones of the separate functions,
    wherein the performance module includes instructions to generate the overhead scores including instructions to calculate the overhead scores for the respective ones of the segments associated with the separate functions as a ratio of a program count and an instrumentation count relative to a runtime coverage for the separate functions.

2. The overhead assessment system of claim 1, wherein the instrumentation threshold for the respective ones of the separate functions is based, at least in part, on one or more characteristics associated with the separate functions including at least an importance level for instrumenting the separate functions as defined by an instrumentation policy.

3. The overhead assessment system of claim 1, wherein the instrumentation module includes instructions to selectively modify the segments of instrumentation including instructions to improve the overhead scores by altering the instrumentation for unsatisfactory functions of the separate functions that do not satisfy the instrumentation threshold.

4. The overhead assessment system of claim 3, wherein altering the instrumentation for the unsatisfactory functions includes one of: removing the instrumentation and replacing the instrumentation with optimized instrumentation that results in an improved overhead score for the unsatisfactory function.

5. The overhead assessment system of claim 1, wherein the instrumentation is security instrumentation that controls a flow of the program to prevent redirection of the flow from secondary interactions that are external to the program.

6. The overhead assessment system of claim 5, wherein the performance module includes instructions to analyze the program including instructions to generate the program count and the instrumentation count, wherein the program count indicates a number of instructions of the program associated with the separate functions, and wherein the instrumentation count indicates a number of instructions of the instrumentation for the respective segments.

7. The overhead assessment system of claim 5, wherein the performance module includes instructions to analyze the program including instructions to dynamically capture the runtime coverage for the separate functions of the program as the program is executed.

8. The overhead assessment system of claim 5, wherein the performance module includes instructions to analyze the program including instructions to statically determine the runtime coverage for the separate functions by calculating the runtime coverage according to an entry point into the program and a recursive analysis of the program according to a limited path depth.

9. A non-transitory computer-readable medium storing instructions for selectively instrumenting a program and that when executed by one or more processors cause the one or more processors to:
    analyze the program to generate overhead scores associated with segments of instrumentation within separate functions of the program, wherein the instrumentation is combined with source code to provide functionality in addition to a base functionality of the program; and
    selectively modify the segments in the source code of the program for the separate functions according to whether the overhead scores for respective ones of the segments satisfies an instrumentation threshold associated with respective ones of the separate functions,
    wherein the instructions to generate the overhead scores include instructions to calculate the overhead scores for the respective ones of the segments associated with the separate functions as a ratio of a program count and an instrumentation count relative to a runtime coverage for the separate functions.

10. The non-transitory computer-readable medium of claim 9, wherein the instrumentation threshold for the respective ones of the separate functions is based, at least in part, on one or more characteristics associated with the separate functions including at least an importance level for instrumenting the separate functions as defined by an instrumentation policy.

11. The non-transitory computer-readable medium of claim 9, wherein the instructions to selectively modify the instrumentation include instructions to improve the overhead scores by removing the instrumentation for unsatisfactory functions of the separate functions that do not satisfy the instrumentation threshold.

12. The non-transitory computer-readable medium of claim 9, wherein the instrumentation is security instrumentation that controls a flow of the program to prevent redirection of the flow from secondary interactions that are external to the program.

13. The non-transitory computer-readable medium of claim 9, wherein the instructions to analyze the program include instructions to dynamically capture the runtime coverage for the separate functions of the program as the program is executed.

14. A method of selectively instrumenting a program, comprising:
in response to compiling the program from source code into machine code, analyzing the program to generate overhead scores associated with segments of instrumentation within separate functions of the program, wherein the instrumentation is combined with the source code to provide functionality in addition to a base functionality of the program; and
selectively modifying the segments in the source code for the separate functions according to whether the overhead scores for respective ones of the segments satisfy an instrumentation threshold associated with respective ones of the separate functions,
wherein generating the overhead scores includes calculating the overhead scores for the respective ones of the segments associated with the separate functions as a ratio of a program count and an instrumentation count relative to a runtime coverage for the respective ones of the segments.

15. The method of claim 14, wherein the instrumentation threshold for the respective ones of the separate functions is based, at least in part, on one or more characteristics associated with the separate functions including at least an importance level for instrumenting the separate functions as defined by an instrumentation policy.

16. The method of claim 14, wherein selectively modifying the segments of instrumentation includes improving the overhead scores by altering the instrumentation for unsatisfactory functions of the separate functions that do not satisfy the instrumentation threshold.

17. The method of claim 16, wherein altering the instrumentation for the unsatisfactory functions includes one of: removing the instrumentation and replacing the instrumentation with optimized instrumentation that results in an improved overhead score for the unsatisfactory function.

18. The method of claim 14,
wherein analyzing the program includes generating the program count and the instrumentation count, wherein the program count indicates a number of instructions of the program associated with the separate functions, and wherein the instrumentation count indicates a number of instructions of the instrumentation for the respective segments.

19. The method of claim 18, wherein analyzing the program includes dynamically capturing the runtime coverage for the separate functions of the program, and wherein the instrumentation is security instrumentation that controls a flow of the program to prevent redirection of the flow from secondary interactions that are external to the program.

20. The method of claim 18, wherein analyzing the program includes statically determining the runtime coverage for the separate functions by calculating the runtime coverage according to an entry point into the program and a recursive analysis of the program according to a limited path depth.

* * * * *